Aug. 10, 1948.  L. D. JAMES  2,446,767
TANK VALVE
Filed May 6, 1947  2 Sheets-Sheet 1

Inventor
Lorenzo D. James

By Clarence A. O'Brien
and Harvey B. Jacobson
Attorneys

Aug. 10, 1948.  L. D. JAMES  2,446,767
TANK VALVE
Filed May 6, 1947  2 Sheets-Sheet 2

Inventor
Lorenzo D. James

By Clarence A. O'Brien
and Harvey B. Jacobson
Attorneys

Patented Aug. 10, 1948

2,446,767

UNITED STATES PATENT OFFICE 2,446,767

TANK VALVE

Lorenzo D. James, Long Beach, Calif.

Application May 6, 1947, Serial No. 746,264

5 Claims. (Cl. 277—63)

1

My invention relates to improvements in tank valves for controlling the discharge of liquid from a tank, the primary object in view being to provide a simple form of valve which closes both inside and outside the tank to form a double seal positively preventing leaking through the valve.

Another object is to provide a valve of the character and for the purpose above indicated which combines the advantages of a screw fed valve and a flap valve in forming a double seal inside and outside the tank.

Other and subordinate objects, also comprehended by my invention, together with the precise nature of my improvements and the advantages thereof will become readily apparent when the succeeding description and claims are read with reference to the drawings accompanying and forming part of this specification.

In said drawings.

Figure 1:
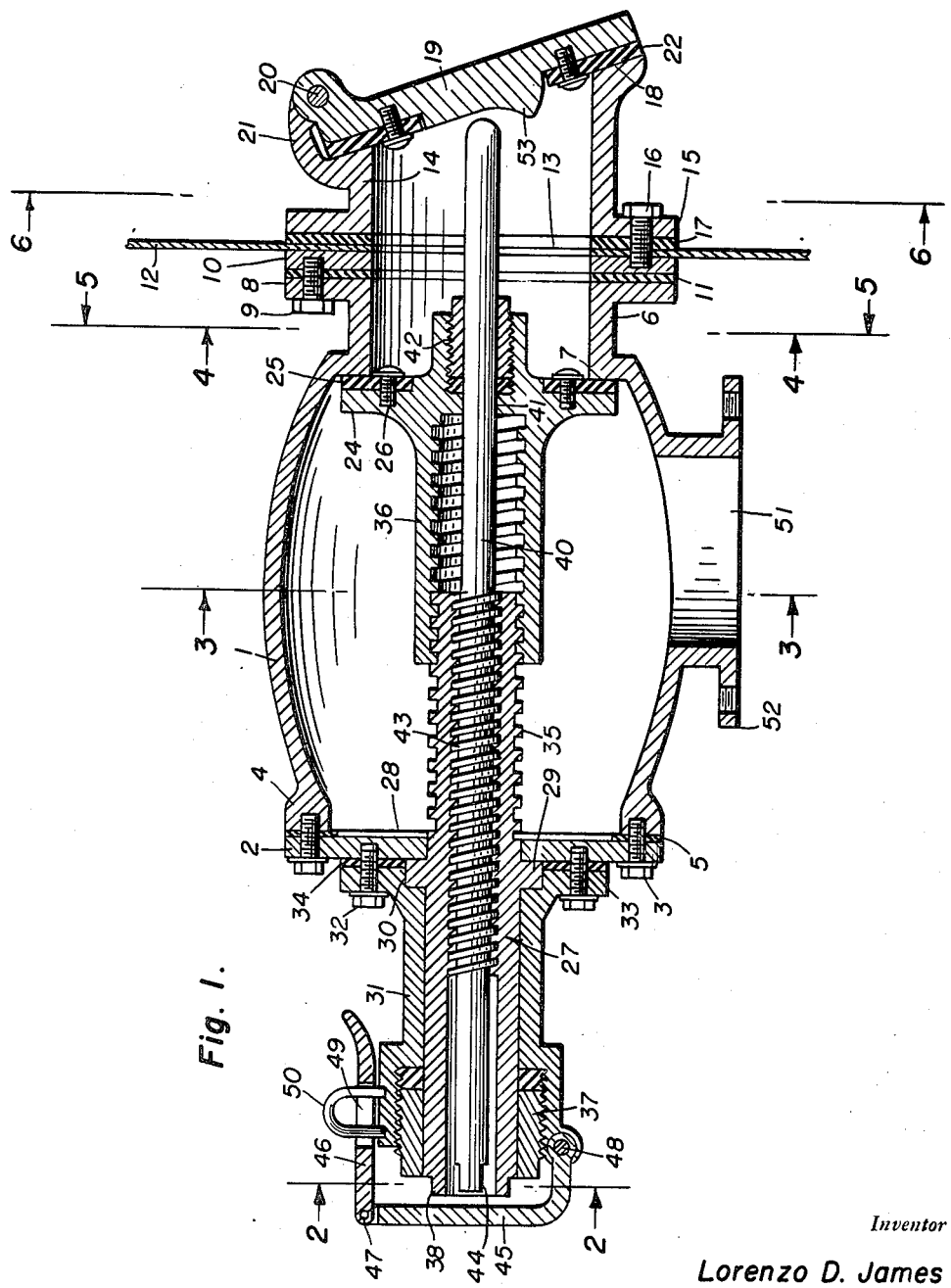
Figure 1 is a view in longitudinal section illustrating my improved tank valve applied and in a preferred embodiment thereof.
Figure 5:
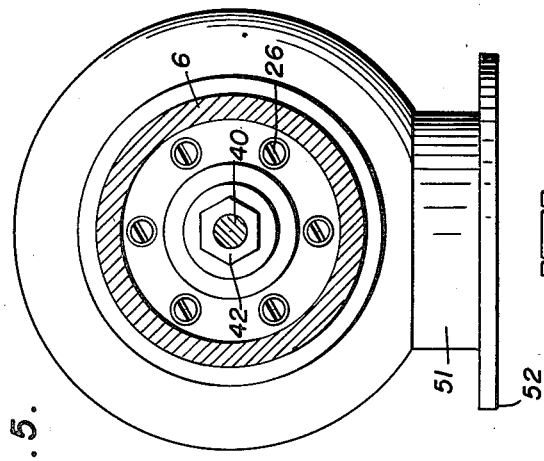
Figure 5 is another similar view taken on the line 5—5 of Figure 1.
Figure 6:
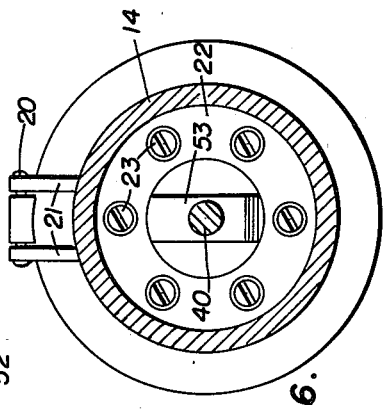
Figure 6 is still another similar view taken on the line 6—6 of Figure 1.
Figure 3:
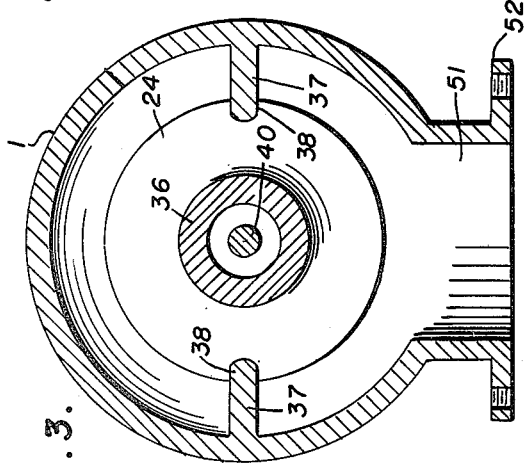
Figure 3 is a view similar to Figure 2 taken on the line 3—3 of Figure 1.
Figure 4:
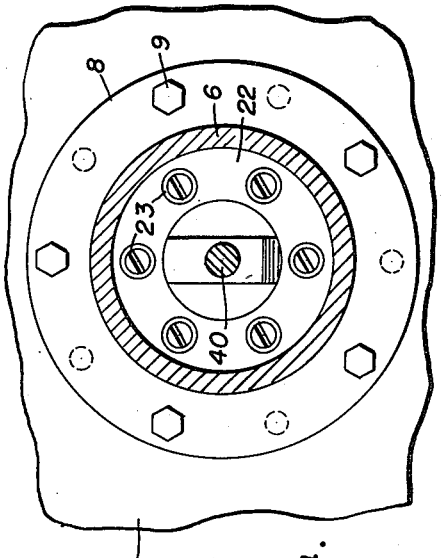
Figure 4 is another similar view taken on the line 4—4 of Figure 1.
Figure 2:
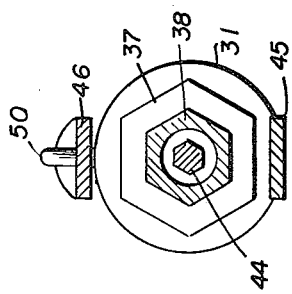
Figure 2 is a view in transverse section taken on the line 2—2 of Figure 1.

Referring now to the drawings by numerals, the body 1 of my improved tank valve is of barrel-like form, preferably, with an axially apertured rear end closure disc 2 bolted, as at 3, to a rear end, circumferential boss 4 on said body with a suitable gasket 5 between said disc and said boss.

A reduced, front end neck section 6 on said body 1 forms, at its juncture with said body, an annular, flat valve seat 7 in the front end of the body 1 concentric thereto, and said neck section 6 terminates in an annular, circumferential flange 8 bolted, as at 9, to an opposed, annular, reinforcing ring 10 with a gasket 11 between the same and said ring 10. The reinforcing ring 10 is secured flat, in a manner presently described, to the outer side of a tank side wall 12 around an outlet aperture 13 in said wall and so that the body 1 extends outwardly from said wall 12 horizontally, as shown.

A neck section 14 complementing the neck section 6 is provided on the inner side of the tank side wall 12 in surrounding relation to said aperture 13, and which embodies an annular, rear

2 end, circumferential flange 15 bolted, as at 16, through the tank side wall 12 to the reinforcing ring 10 with a gasket 17 between said flange 15 and said wall. Thus, the neck section 6, and consequently the body 1, are secured to the tank side wall 12 in the position described, and the tank side wall 12 reinforced around the aperture 13 by said ring 10 and the flange 15 of the neck section 14. The front end of the neck section 14 forms an annular, flap valve seat 18 inclining downwardly away from the tank side wall 12.

A flap valve member 19 is hinged by a pin 20 to a pair of suitable ears 21 on top of the neck section 14 to swing downwardly, under the influence of gravity, and to close the front end of the neck section 14, said valve member 19 having an annular sealing gasket 22 secured thereto by screws 23 and adapted to fit flat against said seat 18.

A disc valve member 24 with an annular, flat, sealing ring 25 secured thereto by screws 26 is provided in the body 1 for adjustment forwardly and rearwardly to engage and disengage the valve seat 7 respectively.

For adjusting the disc valve member 24, a tubular stem 27 is rotatably fitted, intermediate its ends, in the axial aperture 28 in the closure disc 2 to extend into the body 1 axially thereon with an intermediate, circumferential end thrust flange 29 thereon adapted to rotate against the closure disc 2 and in a recess 30 in the front end of a bushing 31 extending rearwardly from the closure disc 2 and in which said stem is journalled. Bolts 32 passing through a circumferential, front end, flange 33 on said bushing 31 and into the closure disc 2 secure said bushing 31 to the body 1 with a suitable sealing gasket 34 interposed between said bushing and the closure disc. The stem 27 is externally threaded, as at 35, within the body 1, and turned into an internally threaded, tubular, axial shank 36 on the disc valve member 24, so that by rotating said stem 27 in opposite directions, said disc valve member 24 may be adjusted forwardly or rearwardly to open or close the neck section 6 as will be clear. Radial guide lugs 37 in the body 1 slidably fitted in the edge notches 38 in the disc valve member 24 prevent said member from rotating so that it may be adjusted in the manner described. The rear end of the stem 27 extends out of a packing gland 38 in the bushing 31 and is provided with a wrench hold 39 for rotating said stem.

For opening the flap valve member 19, a stem 40 is rotatably extended through the stem 27, shank 36, and an axial aperture 41 in the disc valve member 24, and then through a packing gland 42 on the front side of the disc valve member 24, and said stem 40, intermediate its ends, is threaded, as at 43, into the stem 27 for rotation independently of said stem 27 to be fed forwardly and rearwardly when rotated in opposite directions respectively. As will be clear, forward feed of the stem 40 causes the front end thereof to engage the flap valve member 19 and swing said member upwardly into open position. The rear end of the stem 40 is provided with a wrench hold 44 accessible through the rear end of the stem 27 and for rotating said stem 40.

A pair of links 45, 46 at the rear end of the bushing 31 are pivoted together, as at 47, with one link pivoted, as at 48, to said bushing 31 so that the pair of links may be swung over the rear ends of the stems 27, 40 with a slot 49 in one link straddling a staple 50 on the bushing 31, said staple being adapted to receive a padlock, not shown. With the pair of links 45, 46 swung over the rear ends of said stems 27, 40 access to said ends of said stems is blocked, so that the stems cannot be operated by unauthorized persons.

A bottom discharge neck 51 is provided on the body 1 with an end flange 52 for connection to, for instance, a pipeline, not shown.

A wear lug 53 may be provided on the flap valve member 19 for engagement by the stem 40, said lug being shaped to cause accelerated opening of said member 19 relative to feed of the stem 40.

As will be manifest, the flap valve member 19 tends to close, both under the influence of gravity and pressure of liquid against the same and prevents such pressure from working against the disc valve member 24 and thus developing leaks around the same. Either valve member 19, or 24, may be adjusted to open position first and the flap valve member 19 may be set to maintain a desired volume discharge which may be variably controlled by the disc valve member 24.

The foregoing will, it is believed, suffice to impart a clear understanding of my invention, without further explanation.

Manifestly, modifications in the invention as described may be resorted to without departing from the inventive concept, and right is herein reserved to such modifications, as fall within the scope of the appended claims.

What I claim is:

1. A valve for attachment to a side wall of a tank having an aperture in said wall, said valve comprising a hollow body having a reduced front end neck section, and an internal annular valve seat in said end, a neck section complemental to the neck section first mentioned and having a flap valve swingable thereon to open the same, means for attaching said neck sections to opposite sides of said side wall in surrounding relation to said aperture, a disc valve member in said body adapted to be adjusted toward and from said seat, and manipulative means extending into said body for swinging said flap valve member and adjusting said disc valve member independently.

2. A valve for attachment to a side wall of a tank having an aperture in said wall, said valve comprising a hollow body having a reduced front end neck section, and an internal annular valve seat in said end, a neck section complemental to the neck section first mentioned and having a flap valve swingable thereon to open the same, means for attaching said neck sections to opposite sides of said side wall in surrounding relation to said aperture, a disc valve member in said body adapted to be adjusted toward and from said seat, and manipulative means extending into said body for swinging said flap valve member and adjusting said disc valve member independently comprising rotary stems, one rotatable inside the other.

3. A valve for attachment to a side wall of a tank having an aperture in said wall, said valve comprising a hollow body having a reduced front end neck section, and an internal annular valve seat in said end, a neck section complemental to the neck section first mentioned and having a flap valve swingable thereon to open the same, means for attaching said neck sections to opposite sides of said side wall in surrounding relation to said aperture, a disc valve member in said body adapted to be adjusted toward and from said seat, and manipulative means extending into said body for swinging said flap valve member and adjusting said disc valve member independently, comprising rotary stems, one rotatable inside the other and extending through the disc valve member.

4. A valve for attachment to a side wall of a tank having an aperture in said wall, said valve comprising a hollow body having a reduced front end neck section, and an internal annular valve seat in said end, a neck section complemental to the neck section first mentioned and having a flap valve swingable thereon to open the same, means for attaching said neck sections to opposite sides of said side wall in surrounding relation to said aperture, a disc valve member in said body adapted to be adjusted toward and from said seat, and manipulative means extending into said body for swinging said flap valve member and adjusting said disc valve member independently comprising rotary stems one rotatable inside the other and having threaded engagement therewith to cause the same to move endwise upon rotation thereof.

5. A valve for attachment to a side wall of a tank having an aperture in said wall, said valve comprising a hollow body having a reduced front end neck section, and an internal annular valve seat in said end, a neck section complemental to the neck section first mentioned and having a flap valve swingable thereon to open the same, means for attaching said neck sections to opposite sides of said side wall in surrounding relation to said aperture, a disc valve member in said body adapted to be adjusted toward and from said seat, and manipulative means extending into said body for swinging said flap valve member and adjusting said disc valve member independently comprising a rotary stem having threaded engagement with one valve member, and a second stem threaded through the first mentioned stem for feeding by rotation thereof against the other valve member.

LORENZO D. JAMES.